United States Patent [19]

Milohanic

[11] Patent Number: 5,498,286
[45] Date of Patent: Mar. 12, 1996

[54] APPARATUS FOR DOSING A PUMPABLE FLUID

[75] Inventor: Slobodan Milohanic, Aengelholm, Sweden

[73] Assignee: Nestec S.A., Vevey, Switzerland

[21] Appl. No.: 215,268

[22] Filed: Mar. 21, 1994

[30] Foreign Application Priority Data

Mar. 26, 1993 [EP] European Pat. Off. ............. 93105000

[51] Int. Cl.⁶ ...................................... A21C 9/04
[52] U.S. Cl. ............................. 118/13; 99/450.1; 118/14; 118/211; 118/241; 118/242; 118/243; 118/301; 222/361; 222/561
[58] Field of Search ................... 118/13, 14, 211, 118/240–243, 263, 301, 682; 222/559, 561, 361; 99/450.1; 137/874; 251/327; 426/94, 302; 141/129, 153, 156

[56] References Cited

U.S. PATENT DOCUMENTS

| | | | |
|---|---|---|---|
| 1,904,742 | 4/1933 | MacFarlane | 425/128 |
| 2,505,697 | 4/1950 | Vomacka | 222/361 |
| 3,528,386 | 9/1970 | Morine | 118/682 |
| 3,537,406 | 11/1970 | Ort | 426/26 |
| 4,569,462 | 2/1986 | Belokin | 222/561 |
| 4,733,803 | 3/1988 | Sisson et al. | 222/361 |

FOREIGN PATENT DOCUMENTS 12862  9/1916  United Kingdom .

*Primary Examiner*—Laura Collins
*Attorney, Agent, or Firm*—Vogt & O'Donnell

[57] ABSTRACT

A dosing apparatus has a tap member and a housing member. The tap member has opposing planar surfaces which extend between opposing sides, and an aperture extends through the tap member from one opposing surface to the other. The housing member has a base plate which has opposing planar surfaces and an opening which extends through the base plate from one opposing base plate surface to the other. Two opposing housing member sidewalls each extend from the base plate and have a groove which slidably engages two opposing sides of the tap member so that the tap member is positioned between the sidewall so that one tap member planar surface faces one base plate planar surface and so that the housing member is slidably reciprocative in two opposing directions along the tap member opposing sides. The tap member aperture and base plate opening are positioned so that upon sliding of the housing member in one direction of reciprocation, the base plate opening is positioned in communication with the tap member aperture.

4 Claims, 2 Drawing Sheets of the present invention positioned above a conveyor at the start of the dosing operation.

APPARATUS FOR DOSING A PUMPABLE FLUID

BACKGROUND OF THE INVENTION

The present invention relates to an applicator for dosing a layer of filling on a continuously moving substrate, e.g., a dough.

The accurate automatic moulding and dosing of a thin layer of sauce intermittently onto a sheeted dough travelling on a continuously moving conveyor is difficult to achieve, especially if the sauce is viscous. Filling is often applied by hand but, even by this method, it is still difficult to achieve the desired precision.

The present invention provides an applicator for dosing a filling which is suitable for any type of pumpable filling independent of the viscosity, and whereby the filling may be applied with high precision with respect to position, shape and thickness.

SUMMARY OF THE INVENTION

Accordingly, the dosing apparatus of the present invention has a tap member and a housing member. The tap member has opposing planar surfaces which extend between opposing sides, and an aperture extends through the tap member from one opposing surface to the other. The housing member has a base plate which has opposing planar surfaces and an opening which extends through the base plate from one opposing base plate surface to the other. Two opposing housing member sidewalls each extend from the base plate and have a groove which slidably engages two opposing sides of the tap member so that the tap member is positioned between the sidewall so that one tap member planar surface faces one base plate planar surface and so that the housing member is slidably reciprocative in two opposing directions along the tap member opposing sides. The tap member aperture and base plate opening are positioned so that upon sliding of the housing member in one direction of reciprocation, the base plate opening is positioned in communication with the tap member aperture.

Also included in the present invention are means for vertically reciprocating the tap and housing members, means for reciprocating the housing member along the tap member opposing sides and means connected to the tap member for feeding a pumpable fluid to the tap member aperture and thereby to the base plate opening.

Also included in the present invention is a conveyor for transporting a substrate beneath the nozzle. The conveyor is conveniently an endless belt and may advance continuously or intermittently.

In operation with a conveyor, a substrate is conveyed on a surface of the conveyor, the tap and housing members are descended vertically so that the base plate contacts the substrate transported on the conveyor surface, the housing member is positioned at a first position so that the tap member aperture is in communication with the housing member opening and a pumpable fluid is fed from the tap member aperture to the base plate opening, and thereby to the substrate, and the housing member slides along the tap member and advances with the conveyor surface and substrate at substantially the same speed to a second position while the deposited fluid is moulded on the substrate, and then, the tap and housing members are reciprocated vertically from the substrate and the housing member is reciprocated to slide along the tap member sides to the first position.

DETAILED DESCRIPTION OF THE INVENTION

The means for supplying a filling to the tap member aperture may conveniently be a dosing tube connected to a supply of the filling and a pump for supplying the filling. The pump is preferably adapted to supply a predetermined amount of the filling depending on the shape and depth of the mould opening.

The means for reciprocating the tap and housing members vertically and the housing member horizontally may advantageously be provided by hydraulic or pneumatic cylinders and associated pistons. Advantageously, a sensor may be provided on the cylinder for reciprocating the housing member horizontally to indicate the completion of the moulding. The sensor may be a magnetic sensor which is activated by the piston at the end of its movement.

The means for reciprocating the tap and housing members vertically preferably ensures that in the descended position, the housing member base plate surrounding the mould opening contacts the substrate lightly so as not to substantially distort the shape of the substrate, and that in the raised position, the base plate no longer contacts the filling.

The substrate may be, for instance, a sheeted dough and the filling may be any pumpable fluid such as a sauce.

The shape, thickness and the amount of the filling dosed onto the substrate may be varied easily by replacing the housing member with one having a mould opening with different dimensions and adjusting the pump for the filling, if necessary, to distribute the appropriate amount of filling.

Conveniently, the pumping means for the filling and the reciprocating means are sequence controlled by a computer to enable automatic operation.

The present invention is further illustrated by example only with reference to the accompanying drawings.

DETAILED DESCRIPTION OF THE DRAWINGS

Figure 1:
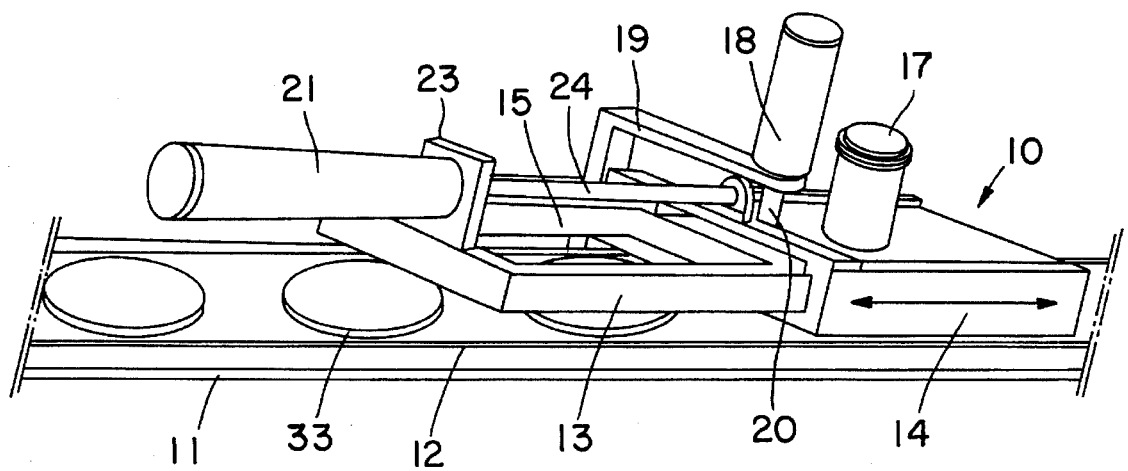
FIG. 1 illustrates a perspective view of the applicator of the present invention positioned above a conveyor at the start of the dosing operation.
Figure 2:
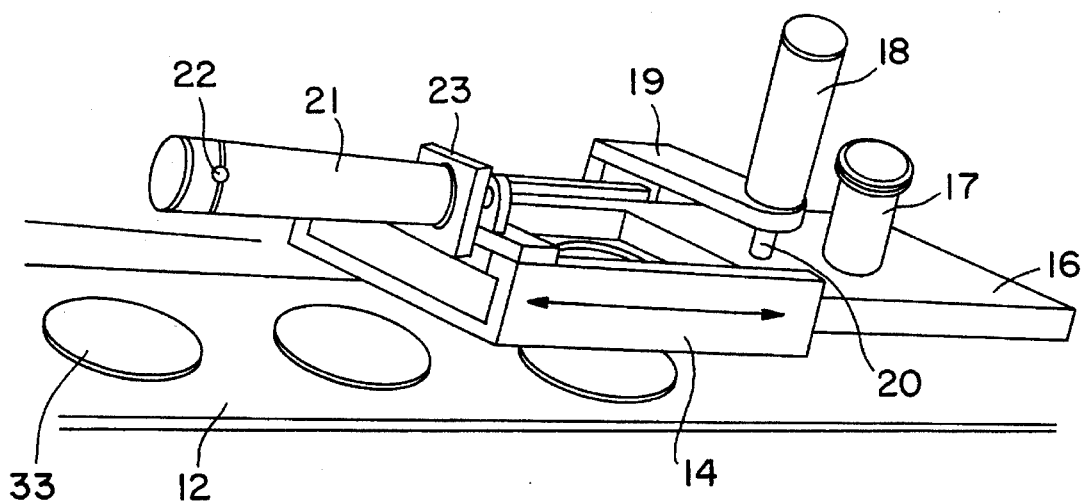
FIG. 2 illustrates a perspective view of the applicator of FIG. 1 at the termination of the dosing operation.

Referring to drawing FIGS. 1 and 2, the applicator generally designated 10 is positioned above a surface of an endless conveyor belt 11 adapted to run continuously for transporting a sheet of pita bread 12. The applicator comprises tap and housing members hereinafter referred to as a valve tap 13 and a valve house 14.

Figure 4:
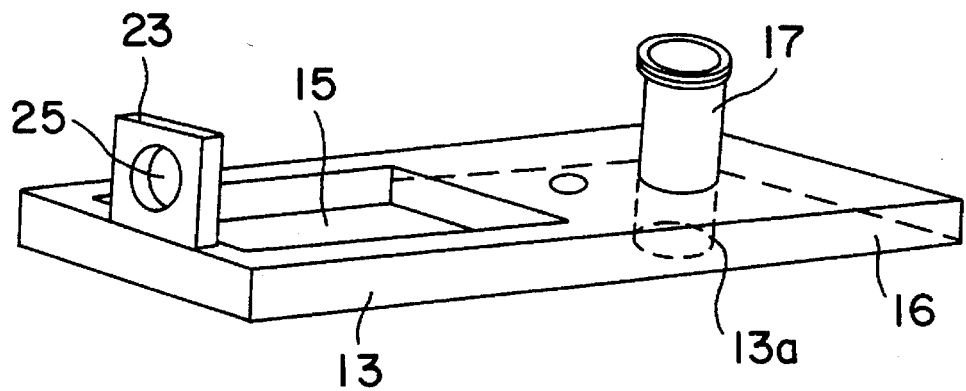
FIG. 4 illustrates the valve tap of the applicator of the present invention.

The valve tap 13, which also is illustrated in drawing FIG. 4, is adapted to reciprocate vertically with the valve house 4 and is provided with an opening 15 and a solid block 16 having opposing sides and having opposing planar surfaces through which an aperture 13a passes and to which is fixed a dosing tube 17 supplied by a pump (not shown). Fitted to the valve tap 13 is a pneumatic cylinder 18 mounted on a fixed support 19 with a vertically reciprocative piston 20 passing through an opening in the fixed support 19, and a pneumatic cylinder 21 provided with a magnetic sensor 22 is mounted on a lug 23 with a horizontally reciprocative piston 24 passing through an opening 25 in the lug 23.

Figure 3:
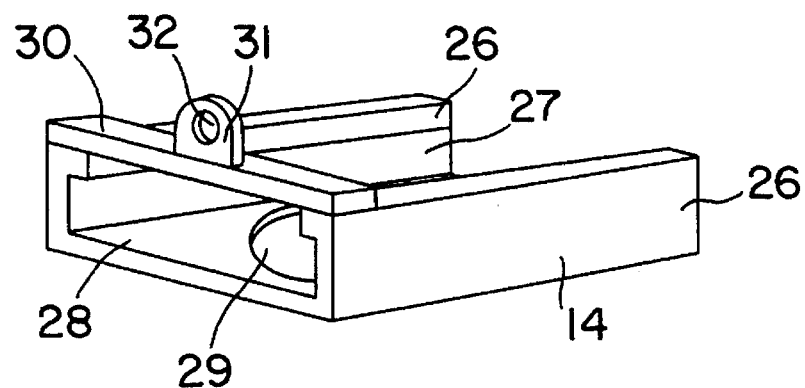
FIG. 3 illustrates the valve house of the applicator of the present invention.

The valve house 14, as illustrated in drawing FIGS. 1 and 2, is slidably mounted on the valve tap 13 to reciprocate horizontally in the direction of the arrows. As illustrated in drawing FIGS. 1–3, the valve house 14 has side walls 26 formed with internal grooves 27 shaped to slide along opposing sides of the valve tap 13 and a base plate 28 through which is a mould nozzle opening 29. The valve house 14 also comprises a cross bar 30 fitted with a lug 31 having an opening 32 to which piston 24 is connected. As further illustrated in drawing FIGS. 1 and 2, moulded fillings 33 are shown on pita bread 12 on the conveyor belt 11. The operating of the applicator is controlled by a computer (not shown).

In operation, the conveyor belt 11 transporting a sheet of pita bread 12 advances continuously to the left in FIGS. 1 and 2 of the drawings. At the start of a cycle, as shown in FIG. 1, the piston 20 descends to lower the whole applicator 10 so that the base plate 28, within which is the mould opening 29, contacts the pita bread with light pressure. A pump is activated by the computer to supply a predetermined amount of a sauce filler 33 which passes through the dosing tube 17 into the mould opening 29, where it lies on the sheet of pita bread 12. As the conveyor belt 11 advances continuously, the piston 24 retracts to the left, with respect to the depictions of FIGS. 1 and 2 of the drawings, at the same speed as the conveyor belt causing, by means of its connection to the lug 31, the valve house 14 to slide to the left along the valve tap 13, with the base plate still lightly contacting the pita bread 12 while the filling 33 is moulded to the contours of the mould opening 29.

When the moulding is completed at the position shown in FIG. 2, the sensor 22 is activated by the end of the piston 24 and sends a signal to the computer which activates the piston 20 to ascend to raise the whole applicator 10 to a height sufficient for the valve house 14 and its base plate 28 to be lifted clear of the moulded filling 33, and then the piston 24 moves to the right, with respect to the depictions of FIGS. 1 and 2 of the drawings, to cause, by means of its connection to the lug 31, the valve house 14 to slide to the right along the valve tap 13 to the position shown in FIG. 1 where a new cycle is commenced by the piston 20 descending to lower the whole applicator.

Moulded fillings 33 are thus dosed consecutively onto the pita bread at high speed, e.g., 40 cycles per minute, and with great accuracy.

There are thus very few moving parts of the applicator according to this invention and the shape, thickness and amount of filling may be varied easily by replacing the valve house with one having a mould opening with different dimensions.

I claim:

1. A dosing apparatus comprising:

a tap member having opposing planar surfaces which extend between opposing sides and having an aperture which extends through the tap member from one opposing surface to the other; and a housing member having a base plate which has opposing planar surfaces and an opening which extends through the base plate from one opposing base plate surface to the other for forming a mold and having two opposing sidewalls which each extend from the base plate and which each have a groove which slidably engages two opposing sides of the tap member so that the tap member is positioned between the sidewalls so that one tap member planar surface faces one base plate planar surface and so that the housing member is slidably reciprocative in two opposing directions along the tap member opposing sides;

wherein the tap member aperture and base plate opening are positioned so that upon sliding of the housing member in one direction of reciprocation, the base plate opening is positioned in communication with the tap member aperture for receiving a pumpable fluid to be molded on a substrate; and means connected to the tap member for vertically reciprocating the tap and housing members; and means connected to the tap member for feeding a pumpable fluid to the tap member aperture for feeding the fluid to the tap member aperture and the base plate opening for molding.

2. An apparatus according to claim 1 further comprising means connected with the tap and housing members for reciprocating the housing member along the tap member opposing sides.

3. An apparatus according to claim 1 further comprising a conveyor having a surface which extends longitudinally for transporting a substrate beneath the housing member base plate so that the substrate is transported towards and away from the the housing member base plate in a direction aligned with the direction of housing member reciprocation and wherein the vertical reciprocation means reciprocates the tap and housing members towards the substrate to contact the substrate.

4. An apparatus according to claim 1 or 2 wherein the means for feeding the fluid comprises a tube.

\* \* \* \* \*

UNITED STATES PATENT AND TRADEMARK OFFICE
CERTIFICATE OF CORRECTION

PATENT NO.  : 5,498,286
DATED       : Mar. 12, 1996
INVENTOR(S) : Slobodan Milohanic It is certified that error appears in the above-indentified patent and that said Letters Patent is hereby corrected as shown below:

On title page, item "[30] Foreign Application Priority Data":

"93105000" should be --93105000.9--.

Column 4, line 39 (line 1 of claim 3), after "claim 1", insert --or 2--.

Signed and Sealed this

Eighteenth Day of June, 1996

Attest:

BRUCE LEHMAN

*Attesting Officer*          *Commissioner of Patents and Trademarks*